US007120243B2

(12) United States Patent
Milton (10) Patent No.: US 7,120,243 B2
(45) Date of Patent: Oct. 10, 2006

(54) SWITCH BUTTONS ACTIVATED FROM AN EXTERNAL NETWORK

(75) Inventor: Stephen M. Milton, Freehold, NJ (US)

(73) Assignee: Avaya Technology Corp., Basking Ridge, NJ (US)

(*) Notice: Subject to any disclaimer, the term of this patent is extended or adjusted under 35 U.S.C. 154(b) by 758 days.

(21) Appl. No.: 10/387,112

(22) Filed: Mar. 11, 2003

(65) Prior Publication Data
US 2004/0179666 A1    Sep. 16, 2004

(51) Int. Cl.
*H04M 3/00* (2006.01)
(52) U.S. Cl. .............. 379/246; 455/554.1; 379/221.14; 379/201.12; 707/3
(58) Field of Classification Search ............... None
See application file for complete search history.

(56) References Cited

U.S. PATENT DOCUMENTS

| | | | |
|---|---|---|---|
| 4,277,649 A | 7/1981 | Sheinbein | |
| 5,339,356 A | 8/1994 | Ishii | 379/234 |
| 5,386,459 A | 1/1995 | Veeneman et al. | 379/93 |
| 5,404,395 A | 4/1995 | Bogart et al. | 379/201 |
| 5,425,077 A | 6/1995 | Tsoi | 455/566 |
| 5,452,347 A | 9/1995 | Iglehart et al. | |
| 5,572,572 A | 11/1996 | Kawan et al. | 379/90.01 |
| 5,577,110 A | 11/1996 | Aquino | |
| 5,615,257 A | 3/1997 | Pezzullo et al. | 379/396 |
| 5,659,603 A * | 8/1997 | Orlofsky | 379/157 |
| 5,790,646 A | 8/1998 | Moon | |
| 5,794,156 A | 8/1998 | Alanara | 455/517 |
| 5,956,655 A | 9/1999 | Suzuki et al. | 345/169 |
| 5,999,827 A | 12/1999 | Sudo et al. | 455/564 |
| 6,038,302 A | 3/2000 | Burok et al. | 379/201 |
| 6,044,403 A | 3/2000 | Gerszberg et al. | 709/225 |
| 6,169,797 B1 | 1/2001 | Wildgrube et al. | 379/233 |
| 6,204,848 B1 | 3/2001 | Nowlan et al. | 345/810 |

(Continued)

FOREIGN PATENT DOCUMENTS

EP    0980176 A1    2/2000

(Continued)

OTHER PUBLICATIONS

Bellcore, Bellcore Analog Display Services Interface (ADSI) SPCS/Server Generic Requirements, Document GR-1273-CORE, Issue 1, 7 pages, Jul. 1998.

(Continued)

*Primary Examiner*—Creighton Smith
(74) *Attorney, Agent, or Firm*—Sheridan Ross P.C.

(57) ABSTRACT

A communication system for use in accessing switch functionality from an external endpoint is provided. The system includes:

(a) a switch 104; and (b) an internal endpoint 106 and an external endpoint 116. Each of the internal and external endpoints is in communication with the switch and associated with a common user. The internal endpoint comprises a plurality of feature activators for activating a plurality of switch-based features, and each feature activator has an associated feature activator identifier and/or an associated feature identifier. The switch comprises a feature access agent 216 operable to (a) receive from the at least one external endpoint a contact comprising a feature activate identifier; (b) determine if the feature activate identifier has a corresponding entry in a stored list of feature activate identifiers associated with a plurality of feature activator identifiers and/or a plurality of feature identifiers; and (c) when the feature activate identifier has a corresponding entry in the stored list, activate at least one of the associated feature activator and feature.

51 Claims, 7 Drawing Sheets

U.S. PATENT DOCUMENTS

| | | | |
|---|---|---|---|
| 6,215,474 B1 | 4/2001 | Shah | 345/168 |
| 6,463,304 B1 | 10/2002 | Smethers | 455/566 |
| 6,516,061 B1 | 2/2003 | Horowitz et al. | 379/233 |
| 6,546,004 B1 * | 4/2003 | Gullicksen | 370/352 |
| 6,546,239 B1 | 4/2003 | Pazdersky et al. | 455/410 |
| 6,554,707 B1 | 4/2003 | Sinclair et al. | 463/39 |
| 6,567,075 B1 | 5/2003 | Baker et al. | 345/172 |
| 6,748,071 B1 * | 6/2004 | Milton | 379/246 |
| 6,751,309 B1 * | 6/2004 | Milton | 379/246 |
| 6,823,197 B1 * | 11/2004 | Chen et al. | 455/554.1 |
| 6,920,339 B1 | 7/2005 | Choy et al. | 455/566 |
| 7,031,443 B1 * | 4/2006 | St-Onge et al. | 379/88.17 |
| 2002/0122547 A1 | 9/2002 | Hinchey et al. | |
| 2003/0016810 A1 | 1/2003 | Milton | 379/242 |
| 2003/0016811 A1 | 1/2003 | Milton | 379/245 |
| 2005/0144008 A1 | 6/2005 | Groves et al. | |

FOREIGN PATENT DOCUMENTS

| | | |
|---|---|---|
| JP | 05-260176 | 10/1993 |
| JP | 09-135320 | 5/1997 |

OTHER PUBLICATIONS

DEFINITY.RTM., Enterprise Communications Server, Release 6, Administration and Feature Description, "Bridged Call Appearance," pp. 4-109 to 4-124, Aug. 1997.

DEFINITY. RTM., Enterprise Communicatins Server, Release 6, Administration and Feature Description, "Terminal Translation Initialization," pp. 4-562 to 4-569, Aug. 19907.

Ayaya Inc.'s "Multivantage™ Software: Product Summary" at http://www.avaya.com/ac/common/index.jhtml?location=M1H1005G1002F2013P3042N4292 (printed Nov. 20, 2002).

Avaya Inc.'s "EC500 Key Features" at http://www.avaya.com/ac/common/index.jhtml?location=M1H1005G1015F2062P3142N4988 (printed Nov. 20, 2002).

Avaya Inc.'s "EC500: Product Summary" at http://www.avaya.com/ac/common/index.jhtml?location=M1H1005G1015F2062P3142N4986 (printed Nov. 20, 2002).

"IP LAN Telephony: the Technology Migration Imperative" Avaya Executive Briefing Paper (Feb. 2002), pp. 1-21.

"Avaya Announces New Enterprise Class IP Solutions (ECLIPS)" Communication without Boundaries (2002).

David Chavez et al., "Avaya MultiVantage™ Software: Adapting Proven Call Processing for the Transition to Converged IP Networks," *Communication without Boundaries* (Aug. 2002).

"SIP (Session Initiation Protocol) In Enterprise-Class IP Telephony Networks," *Communication without Boundaries* (2002).

Avaya Communications, "EC500 Extension to Cellular, Release 2, User's Guide," Issue 1 (Jul. 2001).

Avaya, "EC500 Extension to Cellular, Release 3, User's Guide," Issue 2 (Jan. 2002).

Avaya, "EC500 Extension to Cellular, Release 3 and Release 4, User's Guide," Issue 3 (Aug. 2002).

Avaya, "EC500 Extension to Cellular, Release 4, User's Guide," Issue 4 (Aug. 2002).

* cited by examiner

| Activator Identify | Feature Activate Identifier |
|---|---|
| Activator 1 | 3001 |
| Activator 2 | 3002 |
| Activator 3 | 3003 |
| ⋮ | ⋮ |
| Activator N | 300N |

| Feature Identifier | Feature Activate Identifier |
|---|---|
| active appearance select | 31001 |
| automatic call-back | 31002 |
| call forward all | 31003 |
| call forward busy/no answer | 31004 |
| call forward deactivation | 31005 |
| call park | 31006 |
| call park answer back | 31007 |
| call pick up | 31008 |
| conference on answer | 31009 |
| call number block | 31010 |
| calling number unblock | 31011 |
| directed call pick-up | 31012 |
| drop last added party | 31013 |
| exclusion (toggle on/off) | 31014 |
| extend call enable | 31015 |
| extend call disable | 31016 |
| handover | 31017 |
| held appearance select | 31018 |
| last number dialed | 31019 |
| malicious call trace | 31020 |
| malicious call trace stop | 31021 |
| manual signaling | 31022 |
| priority call | 31023 |
| send all calls | 31024 |
| transfer on hang up | 31025 |
| transfer to voice mail | 31026 |

SWITCH BUTTONS ACTIVATED FROM AN EXTERNAL NETWORK

CROSS REFERENCE TO RELATED APPLICATIONS

The present application contains subject matter related to U.S. patent application Ser. No. 10/370,845 filed Feb. 21, 2003, to Boyle et at. entitled "SUBSCRIBER MOBILITY IN TELEPHONY SYSTEMS"; Ser. No. 09/908,155, filed Jul. 18, 2001, to Milton, entitled "METHOD AND APPARATUS FOR TREATING EXTERNALLY-ORIGINATED CALLS AS COMING FROM INTERNAL SWITCH EXTENSIONS"; and Ser. No. 09/908,156, filed Jul. 18, 2001, Milton, entitled "METHOD AND APPARATUS FOR EXTENDING CALLS TO INTERNAL SWITCH EXTENSIONS OUT TO EXTERNAL NETWORK ENDPOINTS", each of which is incorporated herein by reference.

FIELD OF THE INVENTION

The invention is related generally to call processing in communication systems and particularly to call processing in systems in which calls or other communications are directed to a switch from wired or wireless telephones or other types of user terminals.

BACKGROUND OF THE INVENTION

Conventional communication system switches, such as private branch exchanges (PBXs) and other premises-based telephone switches, generally support a wide variety of useful features, such as bridged call appearances, hunt groups, call forwarding, navigable directories, multi-call conferencing, etc. However, these and other switch-based features are typically provided only to those user terminals that represent internal extensions within the premises serviced by the switch. As a result, a user terminal associated with an external network is generally unable to avail itself of the full set of features supported by the switch.

Bridging has been employed, for example by the EC500™ product of Avaya Inc., to provide not only one-number portability and one-number access to anyone in an enterprise network but also to permit a user at an external originator terminal, specifically a cellular phone, to direct a call to a designated remote access extension to access switch features. Such features can include, e.g., bridged call appearances, hunt groups, call forwarding, navigable directories, multi-call conferencing or any other features supported by the switch. The remote access extension is administered as a number on the switch that may be directly dialed from the originator terminal. When a call to this extension is received in the switch, the switch maps the corresponding identifier to an entry in a stored list of external terminals and connects the call. Once access is granted, particular switch features may be activated by entry of feature access codes by the user or by DTMF signaling. Specifically, remote access may be implemented through the use of one or more abbreviated dialing entries on an abbreviated dialing list. For example, an inputted DID number is converted into a new digit string, such as *7001 (which contains feature access code *70 for a designated abbreviated dialing list plus a dial code 01 for remote access extension entry. This remote feature access functionality is further discussed in copending U.S. patent application Ser. Nos. 09/908,156 and 09/908,155, both filed Jul. 18, 2001.

This approach can have drawbacks. For example, to invoke a feature with a feature access code the user must dial a special direct inward dialing (DID) number to access the switch followed by a series of codes to access only a limited set of features. The features accessible are only those accessible by a trunk-based mode (i.e., by an analog telephone) without the ability to use a flash functionality. As used herein, the terms "trunk" and "trunk line" should be understood to include POTS telephone lines, integrated services digital network (ISDN) lines, T1 lines or various portions or combinations of these and other types of transport media.

Another approach to remotely access features is by means of a "softphone" or software-controlled communication device. A normal personal computer or PC can be converted into a softphone by processing specialized call functionality software. The softphone provides the user with a telephone interface and the ability to conduct conversations using the PC's speakers and microphones. The softphone generally has the same features as a telephone designed to work with a switch, such as a PBX. This approach can work well but requires the use of a device that can be downloaded with emulation software. It also requires the device to establish a direct control link with the switch.

SUMMARY OF THE INVENTION

These and other needs are addressed by the various embodiments and configurations of the present invention. The present invention is directed to remote access by a user of features associated with the user's terminal supported by a switch and/or server.

In accordance with one embodiment of the present invention, an administered station is provided that supports switch features for both an internal endpoint supported by the switch and an external endpoint. Features enacted on either endpoint behave the same. A call towards the station's extension alerts both the internal and external endpoint. The user of the external endpoint has the ability to activate a set of features, including those controlled by feature activators on the internal endpoint. The ability to emulate an activator press is effected by calling special administered extensions, or feature activator identifiers, that map to specific feature activators on the internal endpoint.

There is a broad variety of features that can be activated by this approach. Examples include analog bridged appearance select, abbreviated dialing, active appearance select, automatic appearance select, automatic call back, automatic intercom, autodial, bridged appearance selection, call appearance selection, call forwarding all, call forwarding busy/no answer, call forwarding deactivation, call park, call unpark, call pick-up, conference no answer, conference, calling party number block, calling party number unblock, dial intercom, directed call pick-up, drop last added party, drop call, exclusion (which prevents a user from being active on the same call on a physical port and a trunk port), extend call off-switch enable (to enable the mapping agent), extend call off-switch disable (to disable the mapping agent), group page, handover, held appearance select, hunt night service, last number dialed, malicious call trace activation, malicious call trace deactivation, manual message waiting, priority call, send all calls, manual signaling, transfer on hang up, transfer to voice mail, and trunk night service.

A stored list correlating feature activate indicators with feature activator identifiers and/or feature identities is used during mapping. The feature activator identifiers, for example, can be the location of the activator on the internal endpoint. The feature identities typically provide an abbreviated description of the feature identified by the identity.

The stored list for each endpoint can be different. For example, the same feature activate identifier for two different endpoints can invoke different features.

In another embodiment, call origination mapping is used to provide the external endpoint with the appearance of being originated from an internal endpoint. To provide this functionality, a call origination identifier is compared against a call origination mapping table or stored list to identify a corresponding internal endpoint identity, which is typically an internally supported extension.

The invention can have a number of advantages. First, the present invention can provide access to switch feature functionality from ubiquitous everyday telephones. The current soft phone approach requires a PC or PDA to get the desired functionality. These are not devices that people are used to using as voice communication devices. Second, a user's ability to remotely access switch-based features can lead not only to increased user convenience but also to increased user efficiency. End users, for example, can provide an executive/secretary feature operation without requiring the secretary to perform any tasks. Third, the ability to have different features of different endpoints associated with a common feature activate identifier provides a high degree of flexibility. This is highly advantageous for not only the different types but also the different models of communication devices prevalent in many offices today. This is possible because, from a call-processing point of view, the different users simply "pushed" a button where the same button location on their respective endpoints invokes different features. It is difficult, for example, for users to compare their speed dial entries because each user can be using the same DID speed dial to invoke a different feature.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The Communication System

The invention will be illustrated below in conjunction with an exemplary communication system. Although well suited for use with, e.g., a system having a private branch exchange (PBX) or other similar contact processing switch, the invention is not limited to use with any particular type of communication system switch or configuration of system elements. Those skilled in the art will recognize that the disclosed techniques may be used in any communication application in which it is desirable to provide improved contact processing directed from an external network into a PBX or other communication system switch. The term "contact" or "call" as used herein is intended to include not only telephone calls but also non-telephonic communications, such as data transmissions such as electronic mail, voice-over-IP, facsimile, etc., whether circuit switched or packet switched.

Figure 1:
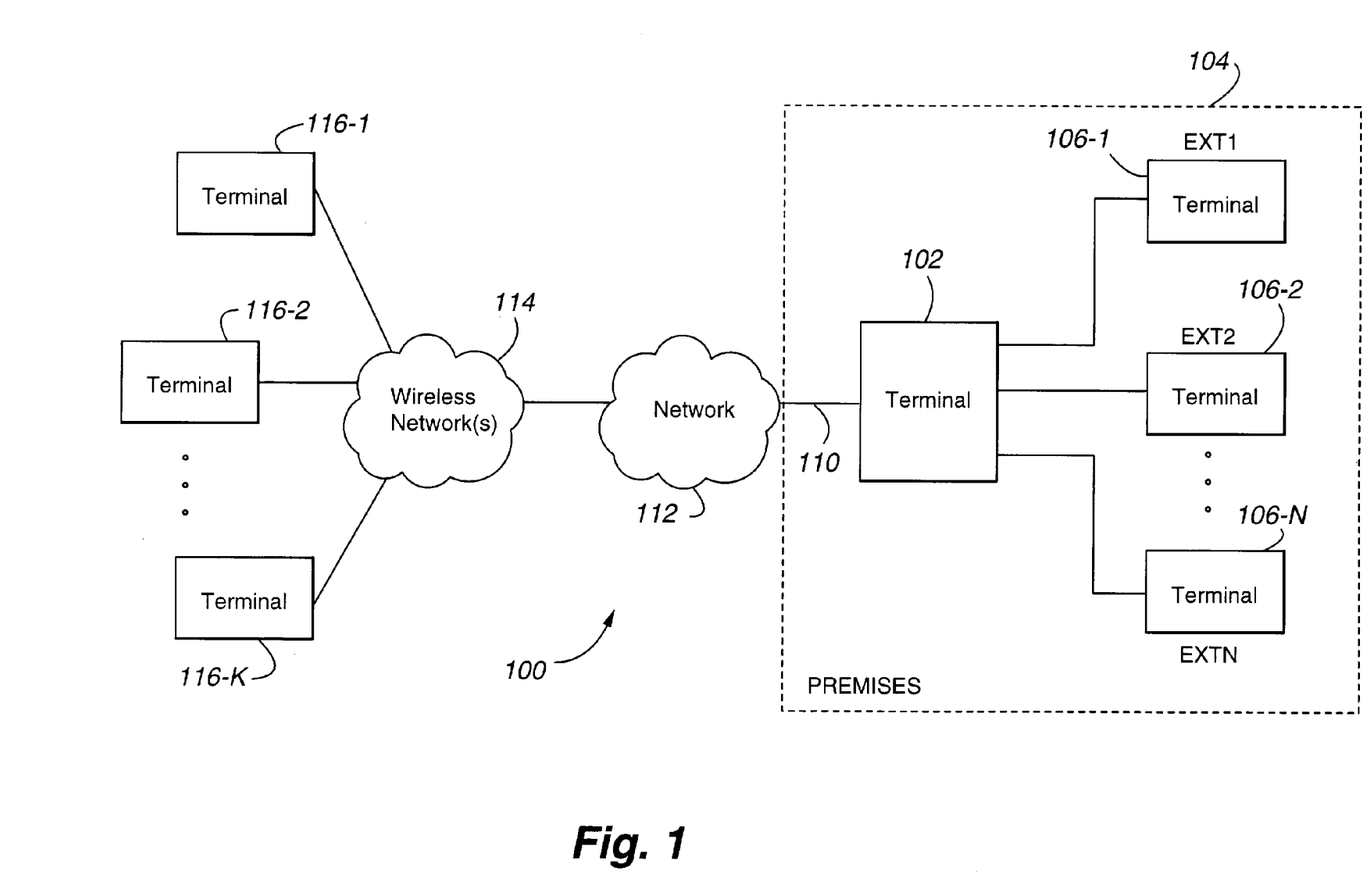
FIG. 1 shows an exemplary communication system according to an embodiment of the present invention.

FIG. 1 shows an exemplary communication system 100 in which the invention is implemented. The system 100 includes a switch 102 which serves a premises 104 having a number of terminals 106-1, 106-2, . . . 106-N that are subscribers to the switch 102. Each of the terminals 106-1, 106-2, . . . 106N corresponds to one of a set of internal extensions Ext1, Ext2, . . . ExtN, respectively as shown. These extensions are referred to herein as "internal" in that they are extensions within the premises 104 that are directly serviced by the switch. More particularly, these extensions correspond to conventional terminal endpoints serviced by the switch, and the switch can direct incoming calls to and receive outgoing calls from these extensions in a conventional manner.

The term "switch" as used herein should be understood to include a PBX, an enterprise switch, or other type of telecommunications system switch, as well as other types of processor-based communication control devices such as servers, computers, adjuncts, etc. By way of example, the switch 102 in the exemplary embodiment may be implemented as an otherwise conventional DEFINITY™ or MULTIVANTAGE™ Enterprise Communication Service (ECS) communication system switch available from Avaya Inc. Other types of known switches are well known in the art and therefore not described in detail herein.

The terminals 106 may be wired desktop telephone terminals or any other type of terminals capable of communicating with the switch 102. The word "terminal" as used herein should therefore be understood to include not only wired or wireless desktop telephone terminals but also other types of processor-based communication devices, including without limitation mobile telephones, personal computers, personal digital assistants (PDAs), etc.

The switch 102 is also coupled via one or more communication lines 110 to a network 112. In one configuration, the communication lines are trunk lines and the network is the public switched telephone network (PSTN). The lines 110 carry incoming contacts from the network 112 to the switch 102 for processing and carry outgoing contacts from the switch 102 to the network 112. The network 112 is coupled via one or more wireless networks 114, which have associated therewith terminals 116-1, 116-2, . . . 116-K. Preferably to permit effective mapping by the switch, the wireless networks or other transit networks between the user's external terminal and corresponding internal terminal are configured such that the switch receives not only the intended destination address but also the source address or identity of the external device initiating the contact.

It should be noted that the invention does not require any particular type of information transport medium between switch 102 and terminals 116, i.e., the invention may be implemented with any desired type of transport medium as well as combinations of different types of transport media. The one or more wireless networks 114 may be wireless cellular systems of a type well known in the art.

Each of the terminals 116-1, 116-2, . . . 116-K represents an external terminal not corresponding to any internal extension of the switch 102. These terminals are referred to as "external" in that they are not directly supported as terminal endpoints by the switch 102. Like the terminals 106, the terminals 116 may be wired or wireless desk sets, mobile telephones, personal computers, PDAs, etc. The terminals 116 are an example of devices more generally referred to herein as "external endpoints."

Although shown as being connected to the wireless network(s) 114 in FIG. 1, one or more of the external terminals 116 could instead be connected directly to the network 112. More generally, the present invention can be implemented using any desired type of external endpoint and network connection.

As will be described in greater detail below, the present invention in accordance with an embodiment of the present invention configures the switch 102 such that one or more of the external terminals 116 are treated substantially as internal switch extensions. Advantageously, this allows a given external terminal to access at least a subset of the desirable contact processing features provided by the switch 102.

It should be emphasized that the configuration of the switch, user terminals, and other elements as shown in FIG. 1 is for purposes of illustration only and should not be construed as limiting the invention to any particular arrangement of elements.

Figure 2:
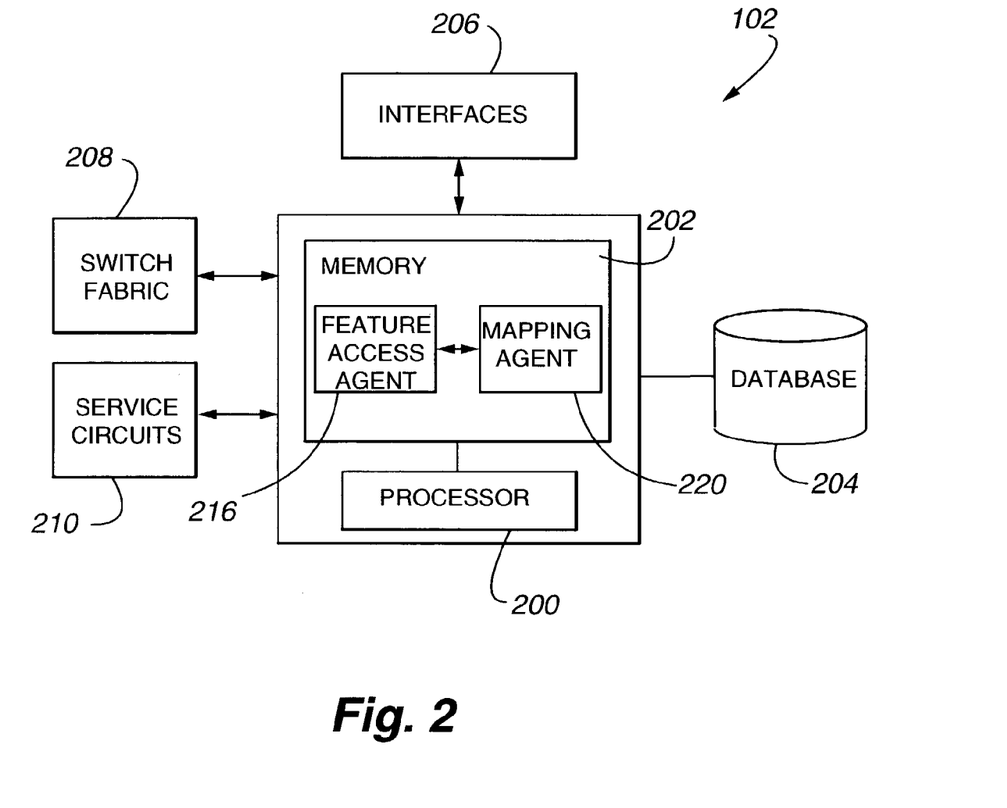
FIG. 2 is a block diagram showing a switch configuration according to an embodiment of the present invention.

FIG. 2 shows a more detailed view of one possible implementation of the switch 102 in the system of FIG. 1. The switch 102 in this implementation includes a processor 200, a memory 202, a database 204, one or more interfaces 206, a switch fabric 208, and a set of service circuits 210. The processor 200 may be implemented as a central processing unit (CPU), microprocessor, application-specific integrated circuit (ASIC) or other type of digital data processor as well as various portions or combinations of such elements. The memory may be a random access memory (RAM), a read-only memory (ROM), or combinations of these and other types of electronic memory devices.

The processor 200 operating in conjunction with the memory 202 executes one or more software programs depicted in FIG. 2 as the feature access agent and the mapping agent.

The feature access agent 216 permits a user to access or activate a set of features (via feature extension codes) including not only switch-controlled features but also those features controlled by feature activators (e.g., buttons) on a desk set. As used herein, a "feature activator" refers to the user interface controls on a communication device that permits the user to activate features from the communication device. Although the interface controls typically are implemented as a plurality of buttons, they may be implemented in many other forms, such as a touch screen, toggles, a pointer device such as a mouse, and combinations thereof. As discussed below, the ability to emulate activator presses on the user's desk set is effected by calling special administered feature activate identifiers, e.g., extensions (typically DID numbers), that map to feature activators on desk set.

The feature activation functionality is in addition to conventional remote feature access using feature access codes.

As will be appreciated, feature activation differs from remote feature access using feature access codes. To invoke a feature with a feature access extension, the user typically dials an entire DID number for each feature. To invoke a feature with a feature access code, the user must dial a special DID number to access the switch, followed by a series of codes. Feature access codes are limited to a maximum of four digits.

The mapping agent 220 maps a call origination identifier (e.g., the telephone number of an external communication device) associated with an incoming contact to a corresponding entry in a stored list or call origination mapping table of external endpoints registered with the switch. If the identifier has a corresponding entry on the list, the switch processes the incoming contact such that it appears to a destination (internal) terminal as being originated by an internal extension.

The term "stored list" or "table" should be understood to include any ordered set of information or data stored in memory or other storage device accessible to the switch. The invention does not require that the information be stored in any particular length or format, e.g., a tabular format, a closed- or open-set, and numerous suitable storage formats will be readily apparent to those skilled in the art.

The database 204 may be, e.g., an optical or magnetic disk-based storage device, or other conventional storage device associated with or otherwise accessible to the switch 102. The database 204 may be used to store, e.g., feature assignments to particular feature activators or codes, directory number assignments to corresponding call appearances or direct facility termination keys, access restrictions, and other known administrative information regarding the configuration of the system 100, as well as other types of information.

The service circuits 210 may include tone generators, announcement circuits, etc. These circuits and the interfaces 206 are controlled by processor 200 in implementing call processing functions in the switch 102.

The switch 102 may include additional elements that are omitted from FIG. 2 for simplicity and clarity of illustration. For example, the switch may include a port card for each type of user terminal associated therewith. In addition, it will be appreciated by those skilled in the art that the switch 102 may be configured to support multiple user terminals of different types, e.g., wired desk set terminals, wireless desk set terminals, personal computers, video telephones or other advanced terminals, etc.

Also associated with the switch 102 may be an administrator terminal (now shown) which is used to program the operation of the switch 102 during a system administration, e.g., an initial set-up and configuration of the system of a subsequent system-level or user-level configuration.

Other devices not shown in the figures may be associated with the switch 102, such as an adjunct feature server. Such an adjunct may be physically incorporated within the switch and may be partially or completely implemented using other switch elements such as processor 200 and memory 202.

The Operation of the Mapping Agent

Figure 5:
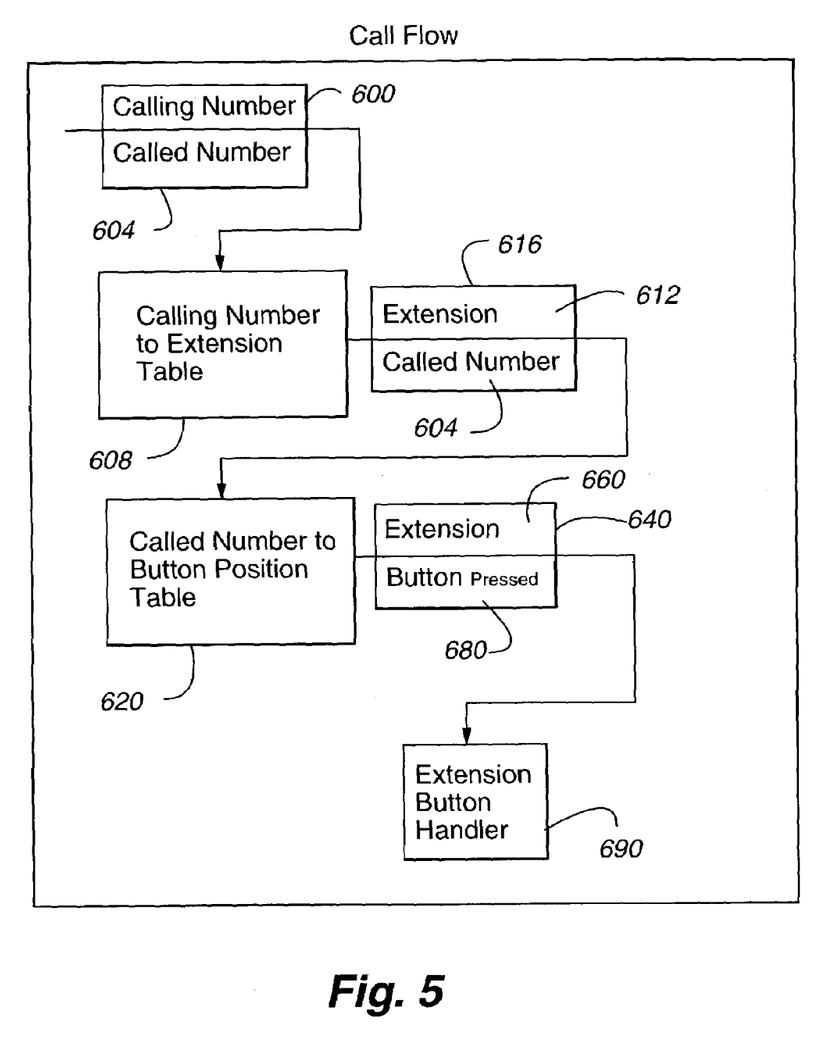
FIG. 5 shows contact flow according to an embodiment of the present invention.
Figure 6:
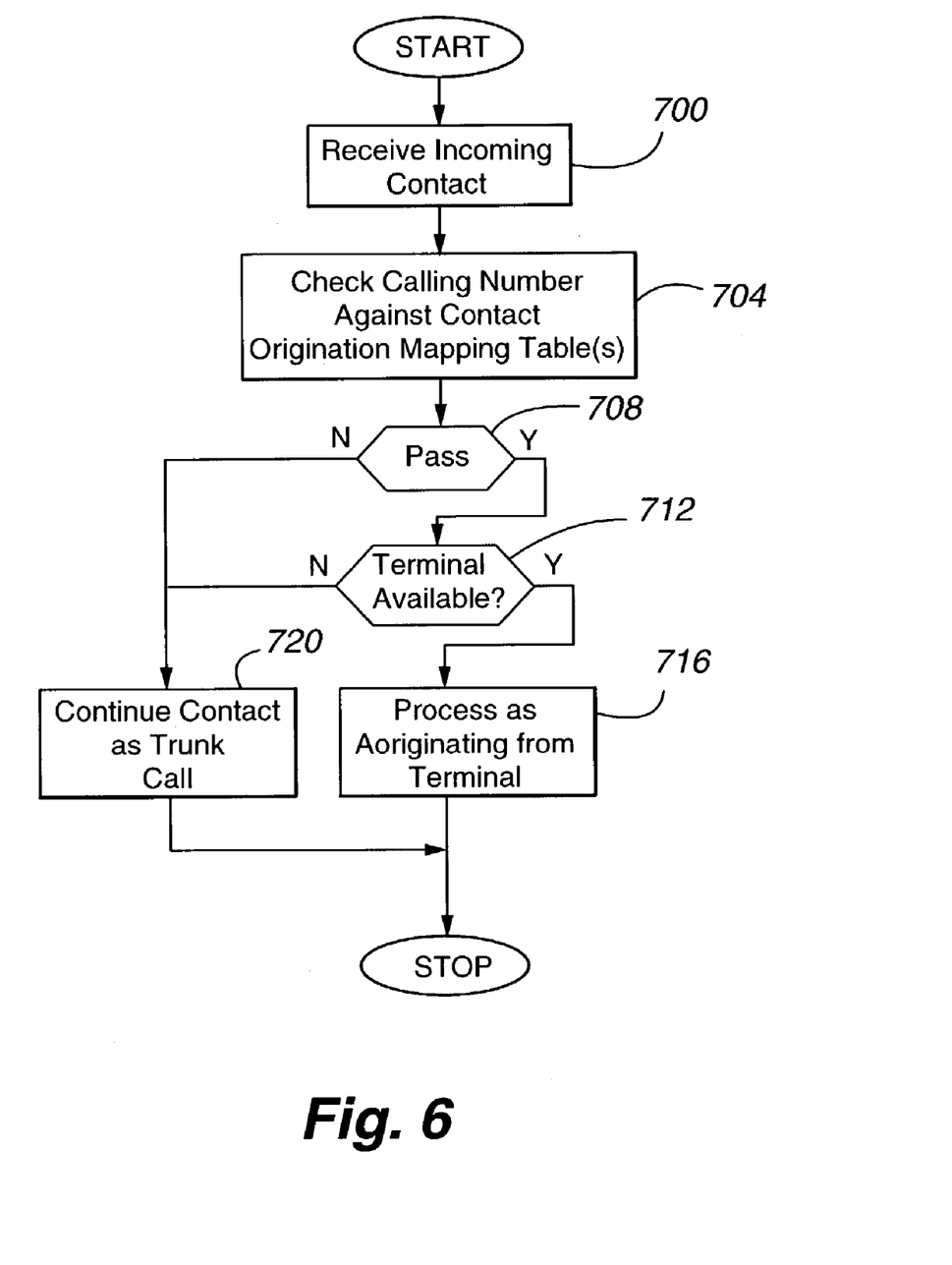
FIG. 6 is a flow diagram showing the operation of the mapping agent according to an embodiment of the present invention.

FIGS. 5 and 6 are, respectively, an incoming call flow diagram and a diagram illustrating the manner in which an incoming call originating at one of the external terminals 116 may be treated as being originated by an internal switch extension.

When the switch receives a call over a trunk and is received in step 700 of FIG. 6, the call, as shown in FIG. 5, includes a call originator identifier or calling number 600 and a destination identifier or called number 604. As shown in by function 608 of FIG. 5 and step 704 of FIG. 6, the call is checked to determine whether it should be treated as a normal trunk call or as being originated by an internal switch extension. This is effected by checking the call identifier or source telephone address against a call origination mapping table (not shown). The table associates a digit string representing call identifiers associated with external terminals with the identifiers of one or more internal terminals. If a match is found (a pairing of an internal extension 612 and the calling number 604 is listed) and an appropriate extend attribute is set, as shown by box 616 of FIG. 5 the corresponding internal station will become the originator of the call so the call will appear to have been launched from the internal terminal rather than the external terminal. In decision diamond 708, if there is no corresponding entry for the incoming call identifier in the mapping table, the call in step 720 is continued as a trunk call. If there is a corresponding entry for the incoming call identifier in the mapping table, the mapping agent proceeds to decision diamond 712.

In decision diamond 712, the mapping agent determines whether or not the corresponding internal terminal is "available". The terminal is deemed to be unavailable if the internal terminal is busied-out or if there is no idle call appearance activator on the terminal. If the terminal is unavailable, the call in step 720 is continued as a trunk call. If the internal terminal is available, the call in step 716 is processed as a call originating from the internal terminal. Generally when a call becomes an internal terminal-generated call, it is treated as a station call and not a trunk call from a feature point of view. The underlying trunk signaling remains on the call (and therefore incoming digits are processed via an incoming call handling table by conventional techniques). The call will originate using an idle call appearance. When the call destination is to a feature activate identifier, the feature access agent is invoked.

The Operation of the Feature Access Agent

Figure 7:
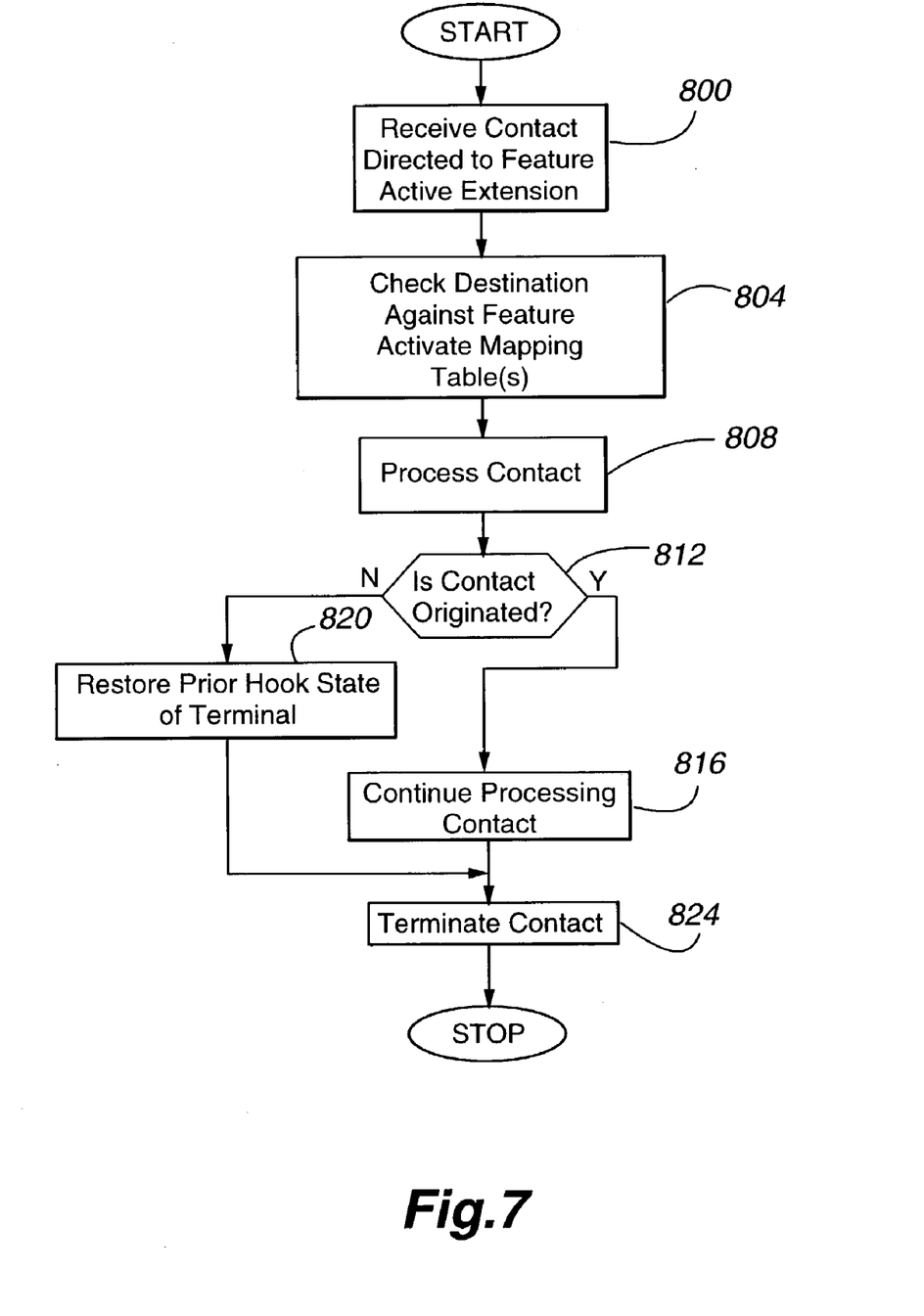
FIG. 7 is a flow diagram showing the operation of the feature access agent according to an embodiment of the present invention.

With reference to FIG. 7 and continuing reference to FIG. 5, the operation of the feature access agent will now be discussed. In general, when feature activator activation is used, the switch treats the feature activate identifier as if the user had pressed the particular activator (whether hard or soft (programmable) buttons) while the internal station (to which the call was mapped by the mapping agent) was in-service and off-hook. The feature activate identifier can be any suitable identifier, whether numeric, alphabetical, or alphanumeric, such as an internal extension supported or serviced by the switch. Any call appearance allocated by the mapping agent for the initial internal extension call origination is relinquished (returned to idle) as soon as the call becomes a feature activator activation. The relinquished call appearance is available for use by the feature invoked by the activator.

Although any class of features can be accessed using the feature access agent, including (a) features that are invoked prior to placing a call, (b) features that are invoked during a call, (c) features that are non-call associated that do not require display interactions, (d) features that are non-call associated that require display interactions, (e) features that are operated against calls not associated with the activating station, and (f) features that are operated against an alerting call, classes (a), (b), and (c) are particularly useful for a user. Examples of such features include without limitation analog bridged appearance select, abbreviated dialing, active appearance select, automatic appearance select, automatic call back, automatic intercom, autodial, bridged appearance selection, call appearance selection, call forwarding all, call forwarding busy/no answer, call forwarding deactivation, call park, call unpark, call pick-up, conference no answer, conference, calling party number block, calling party number unblock, dial intercom, directed call pick-up, drop last added party, drop call, exclusion (which prevents a user from being active on the same call on a physical port and a trunk port), extend call off-switch enable (to enable the mapping agent), extend call off-switch disable (to disable the mapping agent), group page, handover, held appearance select, hunt night service, last number dialed, malicious call trace activation, malicious call trace deactivation, manual message waiting, priority call, send all calls, manual signaling, transfer on hang up, transfer to voice mail, and trunk night service.

In step 800, a contact, such as the contact mapped above, is received directed to a feature activate identifier, e.g., an extension, as the destination or called number. As can be seen from the discussions of the mapping and feature access agent, the definition of "mapping" depends upon the context. "Mapping" refers broadly to include any technique for determining if a given identifier has a corresponding entry on a stored list. For the mapping agent, mapping determines if the call originator identifier has a corresponding entry in the call origination mapping table. For the feature access agent, mapping determines if the feature activate identifier has a corresponding entry in the feature activate mapping table.

In step 804 and function 620 of FIG. 5, the feature access agent 216 maps the called number to a feature activate mapping table to provide a pairing 640 of a feature activate identifier (e.g., extension 660) and activator identifier 680. The identity of the activator 680 is then directed to the extension button handler 690 in the switch for processing by conventional techniques. Feature invocation is thus effected by an inbound trunk contact by means of private facilities, the PSTN, and/or through the use of an incoming call handling table to transform a DID number into a new digit string.

Figure 3:
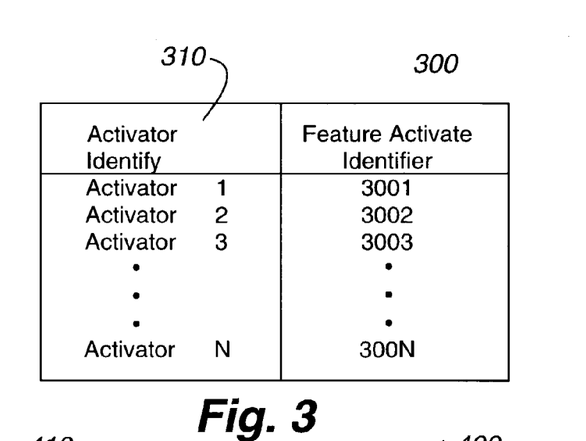
FIG. 3 shows a feature activate mapping table according to an embodiment of the present invention.
Figure 4:
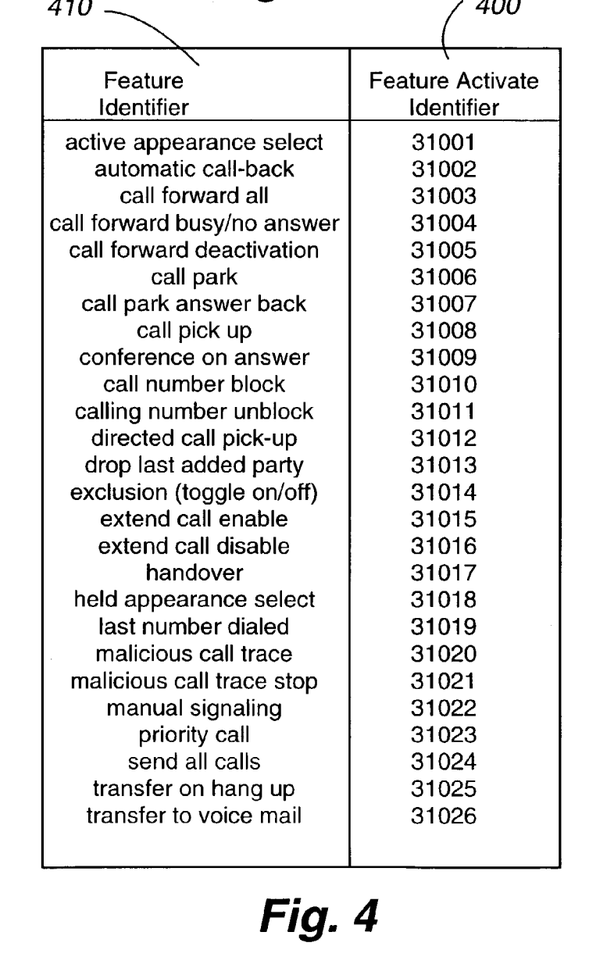
FIG. 4 shows a feature activate mapping table according to an embodiment of the present invention.

Exemplary feature activate mapping tables are shown by FIGS. 3 and 4 in which a number of feature activator identifiers and/or feature identifiers are correlated with a number of feature activate identifiers. As will be appreciated, the feature activator identifiers and feature identifiers can be an numeric, alphabetical, or alphanumeric identification code or scheme, such as one based on the position of each activator on a terminal or upon the function of each feature.

Figure 8:
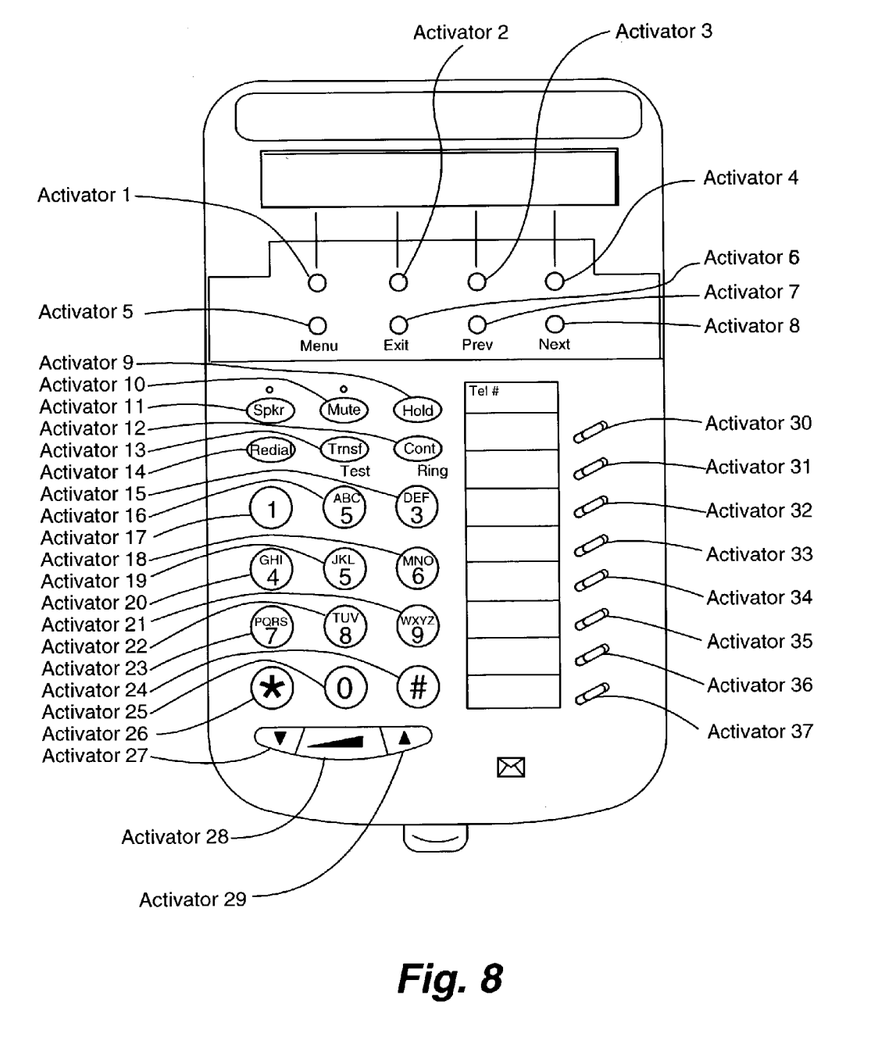
FIG. 8 depicts a typical internal terminal having feature activators.

FIG. 3 shows a table or stored list that maps or correlates the feature activate identifier in column 300 against each activator position in column 310. This table effectively maps the identifier against internal terminal features by activator position regardless of the specific feature identified with the activator. FIG. 8 shows the activators to which the feature activate identifiers are mapped. As can be seen from FIG. 8, each activator is assigned a corresponding identifier, such as activator 1 (or activator A), activator 2 (or activator B), and so forth with activators 1–4 being soft keys, activators 27–29 being the volume control button(s), and activators 30–37 being call appearance/feature buttons. The remaining activators are self explanatory. The feature activate identifier is mapped to the activator identifier. This table is used typically for activators that are in common use on the internal terminals and are not unique to any subgroup of internal terminals. As will be appreciated, the mapping operation fails when no activator exists at the particular location on the internal terminal.

FIG. 4 shows a table or stored list that maps or correlates the feature activate identifier in column 400 by feature identifier in column 410. Feature activate identifiers (e.g., extensions) are paired with either feature activators (e.g., buttons) or feature access codes. When the identifier is called, a feature access code is activated or feature controlled by a unique feature activator is activated. This table effectively maps the identifier against internal terminal features by feature identity regardless of the location of the particular activator identifier to which the feature is assigned. This table is used typically for "fixed key" features (such as transfer and conference) that are not administrable. It may also be used where a variety of type of internal terminals are in use, each with different key layouts. As will be appreciated, the mapping operation fails when the internal terminal is not administered with an activator that performs the named feature and the feature requires an activator.

It is possible that different users associated with different internal terminals can have different key configurations on their respective terminals. For example, the users can have different versions or models of terminals and/or can have programmable keys programmed in different ways. This can cause the same feature activate identifier to invoke different features on each of the user's terminals. For example, identifier "3000" may map to activator 5 on a first user's desk set, which for one user commands that the user wishes to use priority calling while for another user it commands that the user is disabling the send all calls or SAC feature. Thus, the two users would input the same identifier (and typically have a different corresponding stored list) and receive two different treatments.

In step 808, the contact is processed based on the feature identity corresponding to the identifier and audible feedback is provided to the user to indicate the result of the feature invocation. If the feature activated does not cause a call to be originated, the call ends as soon as the feature is processed. In that event, a confirmation tone indicates success, a continuous confirmation tone indicates activator activated (for activators having an on/off state), and an intercept indicates failure or illegal activator. As will be appreciated, no confirmation tone is required for call origination as the dial tone indicates successful call origination.

An example of a non-call origination feature activation is the send-all-calls (SAC) feature. For a single feature activator press, such as the SAC feature, the user would hear confirmation tone and then hang up the call. The send all call feature is then invoked at the internal terminal.

In decision diamond 812, the agent 220 determines whether or not a call is originated by the feature invoked. If not, the agent 220 then proceeds to step 820 and restores the internal terminal to the prior hook state. If so, the agent 220 causes a call origination or connects to an existing call in step 816.

The user may originate a call or move an active call with the external terminal by selecting any idle call appearance through entry of the identifier for the corresponding activator number. Selecting the idle call appearance triggers normal call origination on that call appearance. The caller will hear dial tone and able to enter destination digits. The origination may occur even if the station is off-hook and active on a call. The originations do not change the hook state of the terminal. Non-idle call appearances may be selected if they are not associated with the current call. The user may use this approach to originate conference calls and call transfers.

The user may pick up an existing, active call in different ways. For example, the user may pick up an active call on the internal terminal by dialing an appropriate identifier. The user may pick up a held call on the internal terminal by inputting the appropriate identifier.

When any of the above calls is answered, the voice paths are connected to permit both endpoints to converse with one another.

A number of call origination examples will be discussed to illustrate this step.

In a first exemplary configuration, a party is conferenced into a call. When there is a call present at the internal terminal, the feature activate identifier for conference-on-answer is inputted may be used to conference in another party to the call. After inputting the appropriate identifier, the user receives a dial tone. After the destination for the second party is entered, the user will hear confirmation tone (if the destination is valid) or intercept tone otherwise. The switch will then drop the feature activate identifier call. When the destination answers, it will be conferenced automatically to the first call.

In a second exemplary configuration, a call present at the internal terminal is transferred to another party. After inputting the appropriate identifier, the user receives dial tone. After the destination for the second party is entered, the user will hear normal call progress tones (i.e., ringback) if the destination is valid and intercept tone otherwise. After dialing a valid destination, the user may activate the transfer at any time by dropping both calls at the external terminal (almost) simultaneously.

In a third exemplary configuration, an active call with the user (with the external terminal) is be redirected to the user's covering voice mail. This is effected by dialing the appropriate feature identifier. The user will hear confirmation tone if the operation were successful or an intercept/reorder tone otherwise. When the call is answered at the voice mail processor, the caller will hear the user's standard greeting and may leave a voice mail message.

In a fourth exemplary configuration, the last number dialed feature is invoked. This is effected by inputting the appropriate feature identifier. The user will then hear call progress tones and be connected to the last party that was called from the internal terminal or the last party to have the identity of the internal terminal.

The contact with the external terminal is terminated in step 824 by the switch either after the identified feature is processed when no call is originated or picked up or when the originated or picked up call is terminated.

A number of variations and modifications of the invention can be used. It would be possible to provide for some features of the invention without providing others.

For example in one alternative embodiment, the agents noted above are implemented by a logic circuit, such as an ASIC, or by a combination of software and a logic circuit.

In another alternative embodiment, the functions of the mapping and feature access agents are allocated differently between the agents or the agents are combined into a single module.

In another embodiment, security is maintained for feature invocation by requiring a user to input a security, access, or authorization code prior to or as part of dialing a DID to emulate the activation of a feature activator.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for accessing switch functionality from an external endpoint, comprising:
   providing a switch, at least one internal endpoint, and at least one external endpoint, each of the at least one internal and external endpoints being in communication with the switch and associated with a common user, wherein the at least one internal endpoint comprises a plurality of feature activators for activating a plurality of features;
   receiving from the at least one external endpoint an incoming contact comprising a feature activate identifier;
   determining when the feature activate identifier has a corresponding entry in a stored list of feature activate identifiers, the entries in the stored list being associated with at least one of (i) a plurality of feature activator identifiers associated with the plurality of feature activators and (ii) a plurality of feature identifiers associated with the plurality of features; and
   when the feature activate identifier has a corresponding entry in the stored list, activating at least one of the associated feature activator and feature.

2. The method of claim 1, wherein the contact is received at the external port of the switch from an originator terminal utilizable external to a premises serviced by the switch and not having an extension associated with any internal endpoint serviced by the switch.

3. The method of claim 1, wherein the determining step comprises mapping the feature activate identifier associated with the incoming contact to the corresponding entry in the stored list.

4. The method of claim 1, wherein the corresponding entry is at least one of the plurality of feature activator identifiers.

5. The method of claim 1, wherein the corresponding entry is at least one of the plurality of feature identifiers.

6. The method of claim 1, wherein the incoming contact is originated by an originator terminal comprising a wireless terminal coupled to a wireless network external to a premises serviced by the switch.

7. The method of claim 1, wherein the incoming contact is originated by an originator terminal comprising a wired terminal coupled to a wired network external to a premises serviced by the switch.

8. The method of claim 1, further comprising:
   determining if a call origination identifier associated with the incoming contact has a corresponding entry in a stored list of external endpoints registered with the switch; and
   when the call origination identifier associated with the incoming contact has a corresponding entry in a stored list of external endpoints registered with the switch, processing the incoming contact such that the incoming contact appears to a destination terminal as being originated by an internal extension associated with the switch.

9. The method of claim 8, further comprising:
   when the call origination identifier associated with the incoming contact has no corresponding entry in a stored list of external endpoints registered with the switch, continuing the contact as a trunk call.

10. The method of claim 8, wherein the internal endpoint associated with the user is associated with the internal extension and further comprising:
    determining whether the internal endpoint is available;
    when the internal endpoint is available, performing the processing step; and
    when the internal endpoint is unavailable, continuing the contact as a trunk call.

11. The method of claim 1, wherein in the activating step the switch processes the associated at least one of the plurality of feature activator identifiers and plurality of feature identifiers as if the user had pressed the associated feature activator in the internal endpoint while the internal endpoint was in service and off hook.

12. The method of claim 1, wherein the plurality of features are selected from one or more of the following sets of features: (a) features that are invoked prior to placing a contact, (b) features that are invoked during a contact, (c) features that are non-contact associated that do not require display interactions, (d) features that are non-contact associated that require display interactions, (e) features that are operated against contacts not associated with the activating station, and (f) features that are operated against an alerting contact.

13. The method of claim 1, wherein the plurality of features comprise a plurality of the following features: analog bridged appearance select, abbreviated dialing, active appearance select, automatic appearance select, automatic call back, automatic intercom, autodial, bridged appearance selection, call appearance selection, call forwarding all, call forwarding busy/no answer, call forwarding deactivation, call park, call unpark, call pick-up, conference no answer, conference, calling party number block, calling party number unblock, dial intercom, directed call pick-up, drop last added party, drop call, exclusion (which prevents a user from being active on the same call on a physical port and a trunk port), extend call off-switch enable (to enable the mapping agent), extend call off-switch disable (to disable the mapping agent), group page, handover, held appearance select, hunt night service, last number dialed, malicious call trace activation, malicious call trace deactivation, manual message waiting, priority call, send all calls, manual signaling, transfer on hang up, transfer to voice mail, and trunk night service.

14. The method of claim 1, wherein the feature activate identifier is associated with an internal extension associated with the switch.

15. The method of claim 1, wherein, in the stored list, the plurality of feature activator identifiers are based upon activator position on the internal endpoint.

16. The method of claim 1, wherein the at least one internal endpoint comprises a plurality of internal endpoints, each of the plurality of internal endpoints having a plurality of corresponding feature activators and wherein a common feature activate identifier defines a first feature for a first internal endpoint and a second feature for a second internal endpoint and the first and second features are different.

17. The method of claim 1, further comprising:
providing audible feedback to the user after the activating step, the audible feedback indicating the success or failure of feature activation.

18. The method of claim 1, further comprising:
determining if a contact has been originated by the activating step;
when a contact has been originated by the activating step, providing the user with a dial tone; and
when a contact has not been originated by the activating step, terminating the contact and restoring the internal endpoint to a prior hook state.

19. The method of claim 1, wherein, in the activating step, the user selects an idle call appearance on the internal endpoint.

20. The method of claim 1, wherein, in the activating step, a party is conferenced into an active contact.

21. The method of claim 1, wherein, in the activating step, an active contact with the user is transferred to another party.

22. The method of claim 1, wherein an active contact with the user is redirected to the user's voice mail administered by the switch.

23. A computer readable medium containing executable instructions to perform the steps of claim 1.

24. A logic circuit configured to perform the steps of claim 1.

25. A communication system for use in accessing switch functionality from an external endpoint, comprising:
a switch; and
at least one internal endpoint and at least one external endpoint, each of the at least one internal and external endpoints being in communication with the switch and associated with a common user, wherein the at least one internal endpoint comprises a plurality of feature activators for activating a plurality of features;
wherein the switch comprises a feature access agent operable to (a) receive from the at least one external endpoint a contact comprising a feature activate identifier; (b) determine when the feature activate identifier has a corresponding entry in a stored list of feature activate identifiers the entries in the stored list being associated with at least one of (i) a plurality of feature activator identifiers associated with the plurality of feature activators and (ii) a plurality of feature identifiers associated with the plurality of features; and (c) when the feature activate identifier has a corresponding entry in the stored list, activate at least one of the associated feature activator and feature.

26. The system of claim 25, wherein the contact is received at the external port of the switch from an originator terminal utilizable external to a premises serviced by the switch and not having an extension associated with any internal endpoint serviced by the switch.

27. The system of claim 25, wherein the feature access agent maps the feature activate identifier associated with the incoming contact to the corresponding entry in the stored list.

28. The system of claim 25, wherein the corresponding entry is at least one of the plurality of feature activator identifiers.

29. The system of claim 25, wherein the corresponding entry is at least one of the plurality of feature identifiers.

30. The system of claim 25, wherein the incoming contact is originated by an originator terminal comprising a wireless terminal coupled to a wireless network external to a premises serviced by the switch.

31. The system of claim 25, wherein the incoming contact is originated by an originator terminal comprising a wired terminal coupled to a wired network external to a premises serviced by the switch.

32. The system of claim 25, wherein the switch further comprises a call origination mapping agent operable to (a) determine if a call origination identifier associated with the incoming contact has a corresponding entry in a stored list of external endpoints registered with the switch and (b) when the call origination identifier associated with the incoming contact has a corresponding entry in a stored list of external endpoints registered with the switch, process the incoming contact such that the incoming contact appears to a destination terminal as being originated by an internal extension associated with the switch.

33. The system of claim 32, wherein the mapping agent is further operable to (c), when the call origination identifier associated with the incoming contact has no corresponding entry in a stored list of external endpoints registered with the switch, continue the contact as a trunk call.

34. The system of claim 32, wherein the internal endpoint associated with the user is associated with the internal extension and wherein the mapping agent is further operable to (c) determine whether the internal endpoint is available; (d) when the internal endpoint is available, perform the processing function; and (e) when the internal endpoint is unavailable, continue the contact as a trunk call.

35. The system of claim 25, wherein the feature access agent processes the associated at least one of the plurality of feature activator identifiers and plurality of feature identifiers as if the user had pressed the associated feature activator in the internal endpoint while the internal endpoint was in service and off hook.

36. The system of claim 25, wherein the plurality of features are selected from one or more of the following sets of features: (a) features that are invoked prior to placing a contact, (b) features that are invoked during a contact, (c) features that are non-contact associated that do not require display interactions, (d) features that are non-contact associated that require display interactions, (e) features that are operated against contacts not associated with the activating station, and (f) features that are operated against an alerting contact.

37. The system of claim 25, wherein the plurality of features comprise a plurality of the following features: analog bridged appearance select, abbreviated dialing, active appearance select, automatic appearance select, automatic call back, automatic intercom, autodial, bridged appearance selection, call appearance selection, call forwarding all, call forwarding busy/no answer, call forwarding deactivation, call park, call unpark, call pick-up, conference no answer, conference, calling party number block, calling party number unblock, dial intercom, directed call pick-up, drop last added party, drop call, exclusion (which prevents a user from being active on the same call on a physical port and a trunk port), extend call off-switch enable (to enable the mapping agent), extend call off-switch disable (to disable the mapping agent), group page, handover, held appearance select, hunt night service, last number dialed, malicious call trace activation, malicious call trace deactivation, manual message waiting, priority call, send all calls, manual signaling, transfer on hang up, transfer to voice mail, and trunk night service.

38. The system of claim 25, wherein the feature activate identifier is associated with an internal extension associated with the switch.

39. The system of claim 25, wherein, in the stored list, the plurality of feature activator identifiers are based on activator position on the internal endpoint.

40. The system of claim 25, wherein the at least one internal endpoint comprises a plurality of internal endpoints, each of the plurality of internal endpoints having a plurality of corresponding feature activators and wherein a common feature activate identifier defines a first feature for a first internal endpoint and a second feature for a second internal endpoint and the first and second features are different.

41. The system of claim 25, wherein the switch further comprises service circuits to provide audible feedback to the user after the feature is activated, the audible feedback indicating the success or failure of feature activation.

42. The system of claim 25, wherein the feature access agent is further operable to (d) determine if a contact has been originated by feature activation; (e) when a contact has been originated by feature activation, cause the user to be provided with a dial tone; and (f), when a contact has not been originated by the activating step, cause termination of the contact and restoration the internal endpoint to a prior hook state.

43. The system of claim 25, wherein the feature access agent, in response to the feature activate identifier, selects an idle call appearance on the internal endpoint.

44. The system of claim 25, wherein the feature access agent, in response to the feature activate identifier, conferences a party into an active contact with the user.

45. The system of claim 25, wherein the feature access agent, in response to the feature activate identifier, transfers an active contact with the user to another party.

46. The system of claim 25, wherein the feature access agent, in response to the feature activate identifier, redirects an active contact with the user to the user's voice mail administered by the switch.

47. A memory of a communication system, comprising:
a stored list, the stored list comprising:
(i) a plurality of feature activate identifiers; and
(ii) a corresponding at least one of (a) a plurality of feature activator identifiers corresponding to a plurality of feature activators on a terminal and (b) a plurality of feature identifiers associated with a plurality of features, wherein the plurality of feature activators are operable to activate the plurality of features.

48. The memory of claim 47, wherein the stored list comprises the plurality of feature activator identifiers.

49. The memory of claim 48, wherein each of the feature activator identifiers identify a corresponding feature activator by a position of the feature activator on the terminal and wherein the terminal is internal to a premises administered by a switch.

50. The memory of claim 47, wherein the stored list comprises the plurality of feature identities.

51. The memory of claim 47, wherein the feature activate identifiers are each defined by an internal extension associated with a switch.

* * * * *